United States Patent [19]

De Lepeleire

[11] E Re. 29,302

[45] Reissued July 12, 1977

[54] BAG DIAPHRAGMS AND BAG DIAPHRAGM OPERATED AIR DAMPERS

[75] Inventor: Guido Amandus De Lepeleire, Heverlee, Belgium

[73] Assignee: Danfoss A/S, Nordborg, Denmark

[21] Appl. No.: 667,076

[22] Filed: Mar. 15, 1976

Related U.S. Patent Documents

Reissue of:

[64] Patent No.: 3,804,364
Issued: Apr. 16, 1974
Appl. No.: 166,954
Filed: July 28, 1971

U.S. Applications:

[63] Continuation of Ser. No. 501,288, Aug. 28, 1974.

[51] Int. Cl.[2] ..... F01B 19/02; F16J 3/00

[52] U.S. Cl. ..... 251/43; 251/61; 251/46; 92/34; 137/489.5

[58] Field of Search ..... 137/500, 485, 83, 489.5; 251/43, 61, 44, 45, 46, 25; 92/34, 39, 47, 92

[56] References Cited

U.S. PATENT DOCUMENTS

| | | | |
|---|---|---|---|
| 1,128,228 | 2/1915 | Collar | 251/43 X |
| 1,579,183 | 3/1926 | Weiland | 92/34 X |
| 1,724,977 | 8/1929 | Stein | 251/61 X |
| 2,676,609 | 4/1954 | Pfarrer | 251/61 X |
| 2,686,034 | 8/1954 | Rabal | 251/46 |
| 2,704,648 | 3/1955 | Cobb | 251/61 |
| 3,151,628 | 10/1964 | Heckert | 251/61 X |
| 3,202,061 | 8/1965 | Johnston | 92/37 |
| 3,495,502 | 2/1970 | Bousso | 92/34 |
| 3,506,038 | 4/1970 | Perry et al. | 138/45 |

FOREIGN PATENT DOCUMENTS

| | | | |
|---|---|---|---|
| 885,504 | 8/1953 | Germany | 137/489.5 |

*Primary Examiner*—Arnold Rosenthal

[57] ABSTRACT

The present invention deals with a bag diaphragm comprising one or more flattened extremely flexible bags assembled together, to be mounted between rigid plates at a variable mean distance and to be inflated in operation by a variable pressure difference, and with an air damper operated by means of a bag diaphragm as mentioned above, this air damper being suitable for air conditioning plants, in constant flow, or constant variable flow, or mixing appliances, in fresh air and return air ducts, where an air flow is to be controlled, the operation of the air damper being possible without any electrical or pneumatic energy supply system, due to the particular characteristics of the aforesaid bag diaphragm and particular design of the damper.

7 Claims, 23 Drawing Figures

FIG. 1.
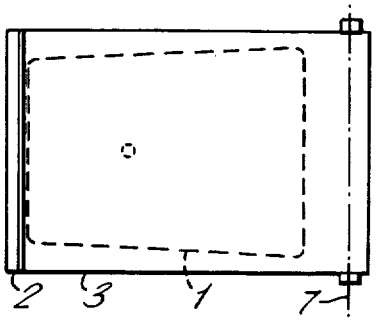
FIG. 2
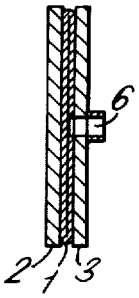
FIG. 3.
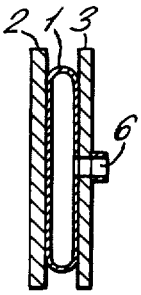
FIG. 4.
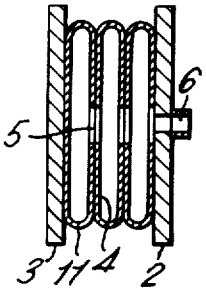
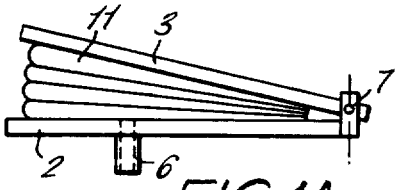
FIG. 1A
FIG. 5C
FIG. 5B
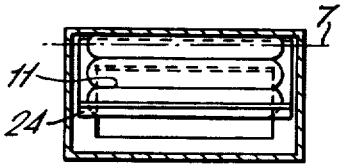
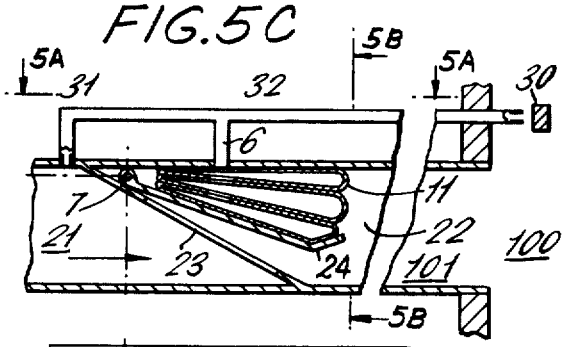
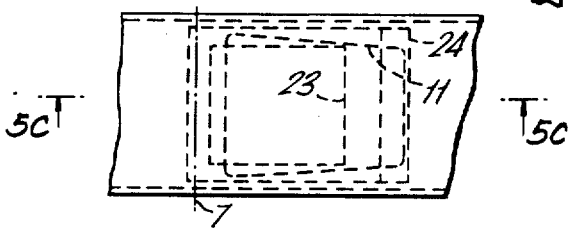
FIG. 5A
FIG. 6A
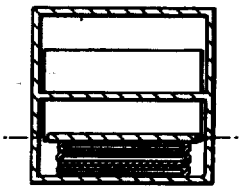
FIG. 6B
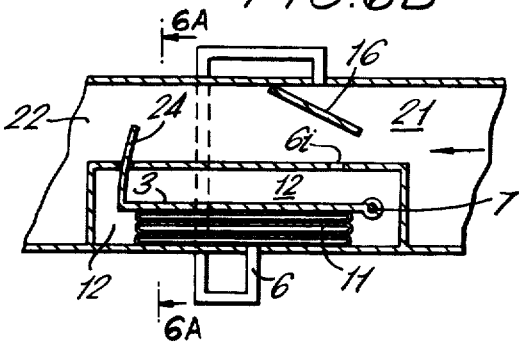

FIG. 10A
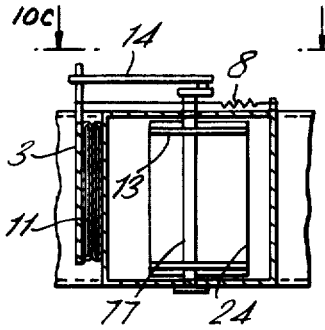
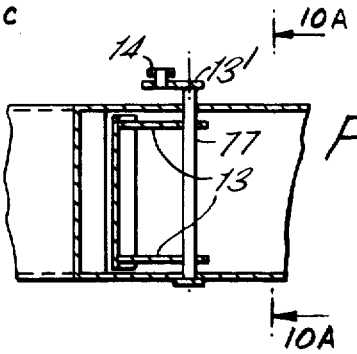
FIG. 10B
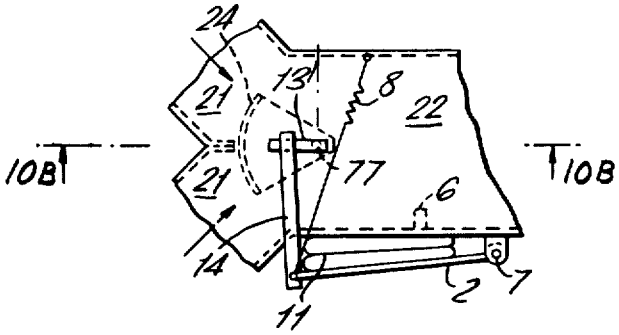
FIG. 10C
FIG. 11A
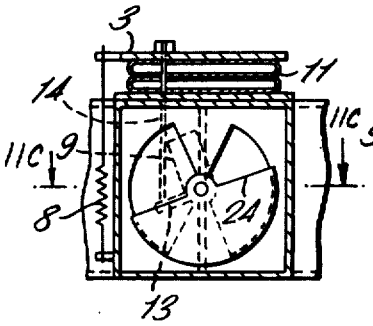
FIG. 11B
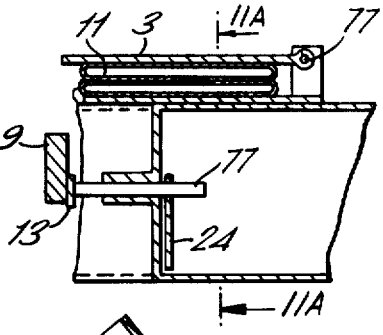
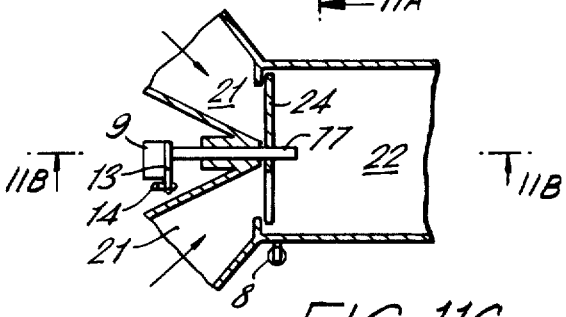
FIG. 11C

BAG DIAPHRAGMS AND BAG DIAPHRAGM OPERATED AIR DAMPERS

Matter enclosed in heavy brackets [ ] appears in the original patent but forms no part of this reissue specification; matter printed in italics indicates the additions made by reissue.

*This application is a continuation of Ser. No. 501,288, filed Aug. 28, 1974, which is a reissue application of Pat. No. 3,804,364.*

The invention relates to a flexible diaphragm for use with measuring and regulating devices which involve a fluid pressure differential mode of operation. The invention also relates to an air damper provided with such a diaphragm an air flow or an air flow ratio, possibly in dependence on a variable to be controlled. A diaphragm conforming to this invention is characterized by its shape and assemblage and by the extreme flexibility of its walls, these characteristics permitting its use as a positioning element in a new type air damper as mentioned above, even by means of very small air pressure differences.

A main object of the invention is to provide new and improved flexible damper assemblies of the type referred to above. Other objects and advantages of the invention will become apparent from the following specification, drawings and appended claims.

BRIEF DESCRIPTION OF THE DRAWINGS

FIGS. 1 and 1A show a substantially rectangular area diaphragm conforming to the present invention.

FIG. 2 shows a cross section of a diaphragm with a single bag.

FIG. 3 shows the diaphragm of FIG. 2 in the inflated state.

FIG. 4 shows a cross section of a diaphragm, of the present invention, with multiple flat bags in the inflated state.

FIGS. 5A, 5B and 5C show an air damper according to the present invention having a pilot operated diaphragm.

FIGS. 6A and 6B show an air damper according to the present invention with an internal air flow adjusting flap.

FIGS. 10A, 10B and 10C show a mixing box conforming to the present invention, having two inlet chambers and one outlet chamber, with a movable blade concentric to a pivot axis.

FIGS. 11A, 11B, and 11C show a mixing box conforming to the present invention, having two inlet chambers and one outlet chamber with a movable blade comprising a disc cut out as a sector.

A diaphragm conforming to the present invention is illustrated in FIGS. 1 to 4. As can be seen in FIG. 1, the example shown here has an almost rectangular effective area. The FIGS. 2 and 3 show cross sections of a diaphragm with a single bag, mounted and set in two different positions, namely entirely deflated (FIG. 2) and inflated to a maximum volume (FIG. 3). This diaphragm consists of a flattened bag 1, with airtight, thin and flexible walls, fitted with a pressure connection 6 and mounted between two rigid plates 2 and 3, one of which is movable with reference to the other, the kind of relative motion of the two plates 2 and 3 being ruled by a suitable guide (slideway, or fixed pivot) not shown here. The relative motion of the plates means a variation of the means distance between them, the said plates being almost parallel. Practically a rotation with limited amplitude about an axis 7, parallel to the said plates will often be preferred. (FIG. 1)

Figure 7A:
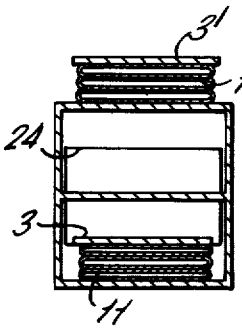
FIGS. 7A, 7B and 7C show an air damper conforming to the present invention, with a controlled pilot pressure.

In principle the bag thickness H should be kept small with reference to the actual bag width L, in order to limit the stresses in the bag wall, and to limit the variations of the effective width Le of the diaphragm, as is easily demonstrated.

When larger strokes or distances are necessary, a diaphragm with multiple flat bags can be used, as shown in FIG. 1, a cross section of which is given in FIG. 4. The consecutive bags, each being quite similar to the single bag as shown in FIGS. 2 and 3 are in communication with each other through apertures 5 in the common walls, the assembly being airtight by glueing or soldering the single bag walls in contact with each other (4). Just as the single bag diaphragm, the multiple bag disphragm has a pressure connection 6, and is mounted between two rigid plates 2 and 3 at a variable means distance.

It must be pointed out that a multiple bag diaphragm is not a bellows, and behaves quite differently. In fact its thin and flexible walls have no significant bending resistance and resist only to tensile stresses. The parts of the wall in contact with the plates 2 or 3, and the common wall parts between adjacent bags do not bend in operation. They only serve to balance the tensile stresses in the peripheral free zones with variable bending radius. Even these flat parts can be made of more rigid material. For good performance the area of the aforesaid apertures 5 should be small with reference to the effective area of the diaphragm. If not the balancing of tensile stresses as explained above would be compromised.

As to the manufacture of same many processes are possible. One can start for example with a very thin walled tube of a convenient diameter, realised by blowing or drawing. Thereafter the bags are finished and assembled by cutting, soldering and/or glueing.

The following FIGS. 5 to 9 refer to air dampers conforming to the present invention. Some examples of construction embodiments and branching possibilities are shown. The FIGS. 10 and 11 are about mixing boxes conforming to this invention.

First, the FIG. 5 illustrates a very simple version of a diaphragm operated air damper. The damper has an inlet chamber 21 and an outlet chamber 22, with a connecting orifice 23 the actual free area of which is varied by means of a movable blade 24, hinged in a fixed pivot 7. The said blade 24 is adjusted by direct contact with a bag diaphragm 11, mounted between the fixed wall of the outlet chamber 22 and the aforesaid movable blade, which in some way acts as a plate 3. When a suitable pressure difference is applied to the diaphragm 11, namely the downstream air pressure outside, and a controlled pilot pressure inside the bag diaphragm, then the blade 24 can be put and hold in any position. In the example shown here the pilot pressure Px is simply taken from a pilot circuit connected upstream and downstream with respect to the air damper. The ratio of the pilot duct 31, 32 flow resistances is varied by moving an obturator 30 called pilot in front of the open end of the downstream pilot duct 32. Now, in all circumstances the hinged blade 24 will find a position in order to balance all related forces. It will be readily understood that with convenient dimensions for all of the parts of the damper and the pilot circuit, the damper can be held in a closed or open position, or in any intermediate position, in dependence on the position of the aforesaid pilot 30. If this pilot is fitted on a bimetal strip for example, the air damper can give a progressive thermostatic response.

FIG. 6 shows schematic sections of an improved construction. Here again there is an inlet chamber 21 and an outlet chamber 22; moreover there is a rigid box 12, containing a movable plate 3 guided by a fixed pivot 7. A movable blade 24 is fixed at the top of the aforesaid plate 3. The said blade is bent and concentric to the fixed pivot 7; when moving it slides through a narrow slot in the wall between the box 12 and the chambers 21 and 22, thus varying the free area available in the damper. The plate 3, and thus the movable assembly 3 + 24 is under the influence of an inflated bag diaphragm 11 mounted within the said box 12. For some applications, a counterweight and/or a spring can be added. Of course the aforesaid slot through which the blade 24 is moving presents a non negligible air leakage. Therefore in most cases the pressure difference applied to it should be limited. Nevertheless an air damper as just described can, with very simple branching, achieve a constant air flow, regardless inlet pressure variations. In this case the diaphragm 11 is exposed to the dynamic pressure as taken in a suitable point in the air flow to be controlled, for example in the inlet chamber 21, as illustrated in FIG. 6. The static pressure is applied inside the box 12 through the inner pressure connection 6i, whereas the total pressure is applied inside the diaphragm by means of the pressure connection 6. The actual air flow can be adjusted by a hand operated flap 16. The force resulting from the inflated diaphragm is opposed to the weight of the movable assembly. The moments of those two forces against the fixed pivot 7 have to balance. If the possible amplitude of rotation of the movable assembly is relatively small with reference to the length of the plate 3, the dynamic pressure can be regulated within acceptable tolerances. Now, an almost constant dynamic pressure in a constant cross section means an almost constant air flow, with suitable tolerances. It is fairly understood that a reduction of the free area where the pressures are taken by means of the flap 16 reduces the resulting air flow. The necessary damping of the system is possible by suitable dimensioning of the pressure connection 6.

Figure 7B:
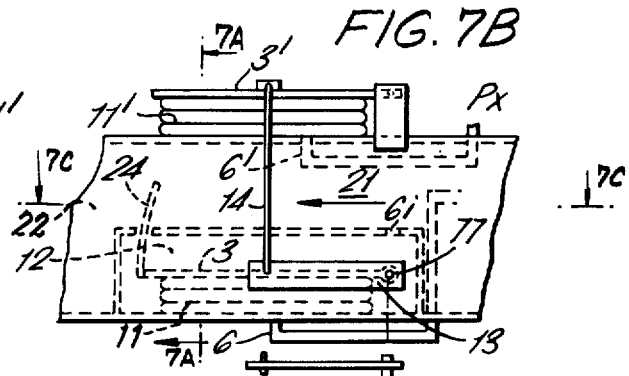
Figure 7C:
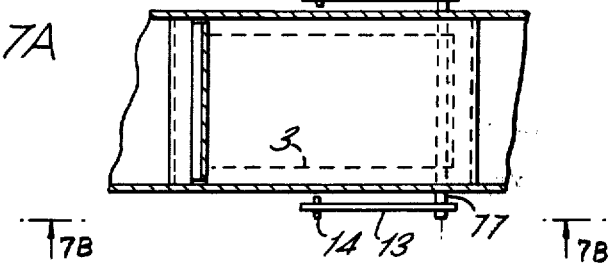

The pivot 7 can be realised by a shaft 77 supported by bearings and mounted through the side walls of the air damper as shown in FIG. 7. Inside the damper, the movable assembly 3 + 24 is rigidly fixed to the shaft 77. In this case, the position of the said assembly can be modified by torsion of the shaft ends by means of an outside located lever loaded by a suitable force. In the example shown the force resulting from an outside disphragm 11' is applied, which is inflated by a controlled pilot pressure Px. At the same time, the inner diaphragm 11 is exposed to a dynamic pressure from the air flow, as explained with the foregoing FIG. 6. It is readily understood that this arrangement-where the forces resulting from both diaphragms 11 and 11' are put together to balance the weights-can achieve an air flow which is constant regardless inlet pressure variations, but variable according to the pilot pressure Px. This is a damper for "constant variable" flow.

Figure 8A:
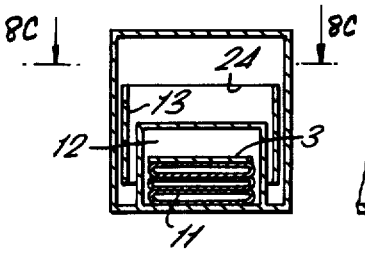
FIGS. 8A, 8B and 8C show an air damper, conforming to the present invention, having a diaphragm box which is not subject to the air pressure in the flow line.
Figure 8B:
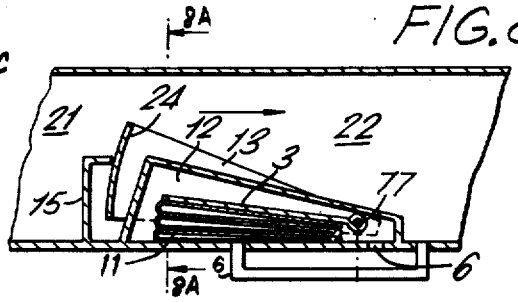
Figure 8C:
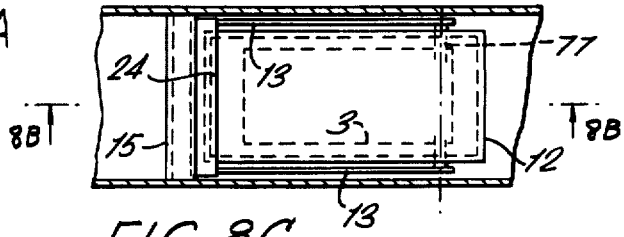

FIG. 8 illustrates another modified construction. In this case the wall between the box 12 and the chambers 21 and 22 has no slot, the only passages being the bearings for the shaft 77, which is rigidly fixed to the plate 3, inside the box 12. The moving blade 24—concentric to the shaft 77—is mounted outside the box 12 and fixed on the shaft ends by levers 13 made of thin sheet, perpendicular to the said shaft. When moving the blade 24 strikes along the edge of the wall 15 between the chambers 21 and 22. As can be seen in the cross section 8A, the box 12 protrudes in the chamber 22 of the damper, which thus has a somewhat sophisticated cross section. As the air leakage through the aforesaid bearings is insignificant, any air pressure can be applied inside the box 12, even quite different from the air pressures in the chambers of the damper. This results in more branching and application possibilities. For example, the branching as illustrated in the present FIG. 8 can achieve a constant downstream pressure when the damper is fitted in an air supply duct with pressures higher than ambient.

Figure 9:
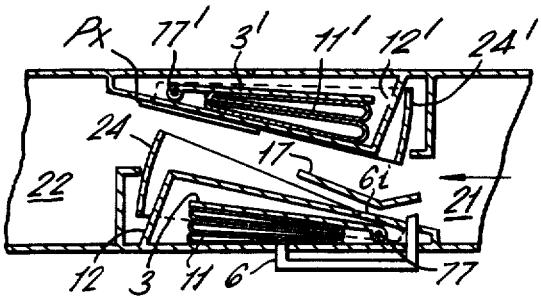
FIG. 9 shows an air damper conforming to the present invention, having two moving blades. The dynamic pressure signal is controlled by a suitably movable flap.

As an other example, FIG. 9 illustrates a damper equipped with two moving blades 24 and 24', and suitable for "constant variable" flow with close tolerances.

A first moving blade 24, fitted on the shaft 77 of a first box 12 is adjusted by means of a bag diaphragm mounted inside the same box the diaphragm being exposed to the dynamic pressure of the air flow to be controlled in the inlet section of the damper, quite similar to what is explained with FIG. 6 above. Now the free area in the inlet section is controlled by a second movable blade 24' independent from the former, and fitted on the shaft 77' of a second box 12'. The latter blade 24' is adjusted by means of a diaphragm 11' inside the box 12', exposed to a suitable pilot pressure Px the pressure inside the box 12' being ambient pressure. This damper operates in a way quite similar to the operation of the damper illustrated in FIG. 6 above. However, in the present case the actual air flow is automatically adjusted by means of the movable blade 24', according to the pilot pressure Px, which in turn depends on any variable to be controlled, for example a temperature.

Amplification of the dynamic pressure signal applied to the bag diaphragm 11, and thus activation of the reactions of the system can be achieved by means of a suitably shaped sheet 17 to be mounted close to the inner pressure connection 6i, in order to make a Venturi. In this way a closer control tolerance can be achieved.

The next FIG. 10 shows a possible construction of an air mixing box conforming to the present invention. Of course, there are two inlet chambers 21, and one outlet chamber 22. The ratio of the free areas available to the air streams to be mixed is controlled and varied by a movable blade 24, with a shape concentric to the vertical shaft 77 on which it is fixed by means of two thin sheet levers 13. The said shaft 77 is mounted through the walls of the outlet chamber. One shaft end has a lever 13', connected by a rod 14 to a movable plate 3, loaded by a spring 8 and in contact with a bag diaphragm 11 which is inflated by a controlled pilot pressure, dependent on a variable to be controlled, for example a temperature.

An alternative construction is shown schematically in FIG. 11. In this case the movable blade 24 consists of a disc cut out as a sector, and perpendicular to the (horizontal) shaft 77 on which it is fixed. A counterweight 9 balances the weight of the blade 24.

It is readily seen how the pilot pressure Px, when inflating the diaphragm 11 strains the spring 8 and adjusts the blade 24 by means of the rod 14, the lever 13 (or 13') and the shaft 77. Thus, this damper controls the ratio of the air flows to be mixed in dependence on the pilot pressure Px.

It must be stressed that all the construction and branching examples shown can be designed in order to operate with very low pilot pressure, below the minimum operating pressures as commonly used in air conditioning plants. Thus it is possible to obtain suitable pilot pressures from the air ducts to be controlled, by means of pilot circuits not extended here. The bag diaphragm operated air dampers conforming to the present invention can operate without any electric or pneumatic energy supply, which means an important advantage. Moreover these dampers have a great functional flexibility, together with simple construction resulting in low cost and easy maintenance.

I claim:

1. A pneumatically operated valve assembly comprising first and second rigid plate members mounted for movement relative to each other and being in oppositely facing relation to each other, guide means for guiding the movement of one of said members relative to the other of said members, bag means sandwiched between said plate members, *said bag means including a plurality of stacked bags having air passage means between adjacent ones of said bags*, said bag means having first portions thereof fixedly secured to *at least one of* said plate members and second portions thereof extending between said plate members, said second portions being characterized by the absence of any significant bending resistance *to allow for the complete collapsing of said bag means due to the weight of one of said plate members upon deflation of said bag means*, and aperture means in said *one of said plate members* [first plate member] for admitting and exhausting air to and from said bag means to adjust the position of said second plate member relative to the position of said first plate member.

2. A valve assembly according to claim 1 including conduit means, said fast plate member being fixed relative to said conduit means.

3. A valve assembly according to claim 2 wherein said second plate member is pivotally mounted relative to said conduit means.

4. A valve assembly according to claim 2 wherein said first plate member is integral with said conduit means.

[5. A valve assembly according to claim 1 wherein said bag means includes a plurality of stacked bags having air passage means between adjacent ones of said bags.]

6. A valve assembly according to claim 2 wherein air passage means extend externally of said conduit means from the upstream side of said plate members to said aperture means.

7. A valve assembly according to claim 6 wherein said air passage means has adjustable vent means for controlling the position of said second plate member.

8. A valve assembly according to claim 7 wherein an apertured partition extends transversely across said conduit means, said second plate member being cooperable with said partition to control the flow of air through said conduit means.

* * * * *